United States Patent
Croak et al.

(10) Patent No.: US 7,664,039 B2
(45) Date of Patent: Feb. 16, 2010

(54) METHOD AND APPARATUS FOR EVALUATING NETWORK OPERATION COSTS

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 499 days.

(21) Appl. No.: 11/343,362

(22) Filed: Jan. 31, 2006

(65) Prior Publication Data

US 2007/0177509 A1 Aug. 2, 2007

(51) Int. Cl.
*G01R 31/08* (2006.01)
(52) U.S. Cl. .................................................. 370/238
(58) Field of Classification Search .............. 370/238, 370/229, 254, 351, 230, 235, 241, 230.1, 370/252; 705/1; 709/241
See application file for complete search history.

(56) References Cited

U.S. PATENT DOCUMENTS 4,261,037 A * 4/1981 Hicks ........................ 705/412

2005/0065805 A1 * 3/2005 Moharram ..................... 705/1
2005/0083844 A1 * 4/2005 Zhu et al. ................. 370/230.1

OTHER PUBLICATIONS

PCT International Search Report and Written Opinion for PCT/US2007/002592, Jun. 18, 2007, copy consists of 10 unnumbered pages.
Profet, K.J., et al., "The risk of trust vs. the cost assurance-trades in the implementation of a secure LAN", The Institution of Electrical Engineers, Stevenage, GB, [Online], 1994.

* cited by examiner

*Primary Examiner*—Kwang B Yao
*Assistant Examiner*—Anh Ngoc Nguyen

(57) ABSTRACT

A method and apparatus for calculating a cost index in a communication network are described. In one embodiment, a plurality of cost factors associated with a first network operation mode is obtained. A plurality of second cost factors associated with a second network operation mode is subsequently obtained. A first cost index is then determined based on the plurality of cost factors associated with the first network operation mode. Likewise, a second cost index is determined based on the plurality of cost factors associated with the second network operation mode. Afterwards, the first cost index is compared to the second cost index to determine whether a recommendation for an implementation of the second operation mode is warranted.

3 Claims, 4 Drawing Sheets

300

METHOD AND APPARATUS FOR EVALUATING NETWORK OPERATION COSTS

BACKGROUND OF THE INVENTION

1. Field of the Invention

Embodiments of the present invention generally relate to telecommunications systems and, more particularly, to a method and apparatus for evaluating network operation costs in a communications network, such as a packet network, e.g., a voice over internet protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

VoIP network providers must often meet time-to-market demands and budgetary constraints that necessitate the utilization of manually intensive operational procedures that preclude them from scaling the network in an efficient manner. Thus, network providers may reap certain benefits by implementing a more automated operation mode within the network. However, the transfer to such a support structure may be a costly endeavor to the network provider. Consequently, due to the advantages and disadvantages presented by the automated operation mode, it may be difficult for VoIP network providers to know if they should continue investing in either a manual operation mode or an automated operation mode. Accordingly, there exists a need in the art for a method and apparatus for evaluating different network operation mode costs in a communication network.

SUMMARY OF THE INVENTION

In one embodiment, a method and apparatus for calculating a cost index in a communication network are described. Specifically, a plurality of cost factors associated with a first network operation mode is obtained. A plurality of second cost factors associated with a second network operation mode is subsequently obtained. A first cost index is then determined based on the plurality of cost factors associated with the first network operation mode. Likewise, a second cost index is determined based on the plurality of cost factors associated with the second network operation mode. Afterwards, the first cost index is compared to the second cost index to determine whether a recommendation for an implementation of the second operation mode is warranted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
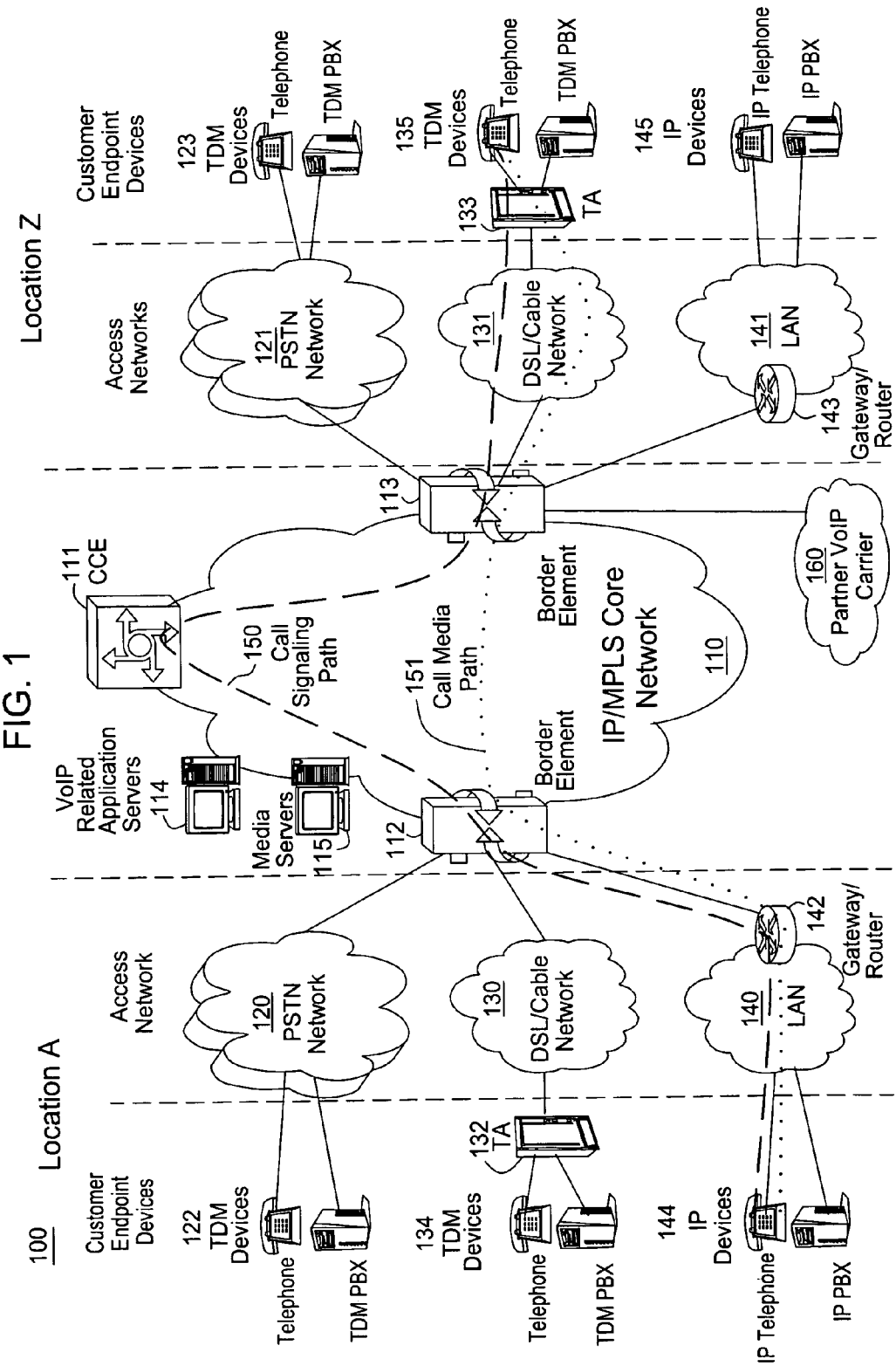
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
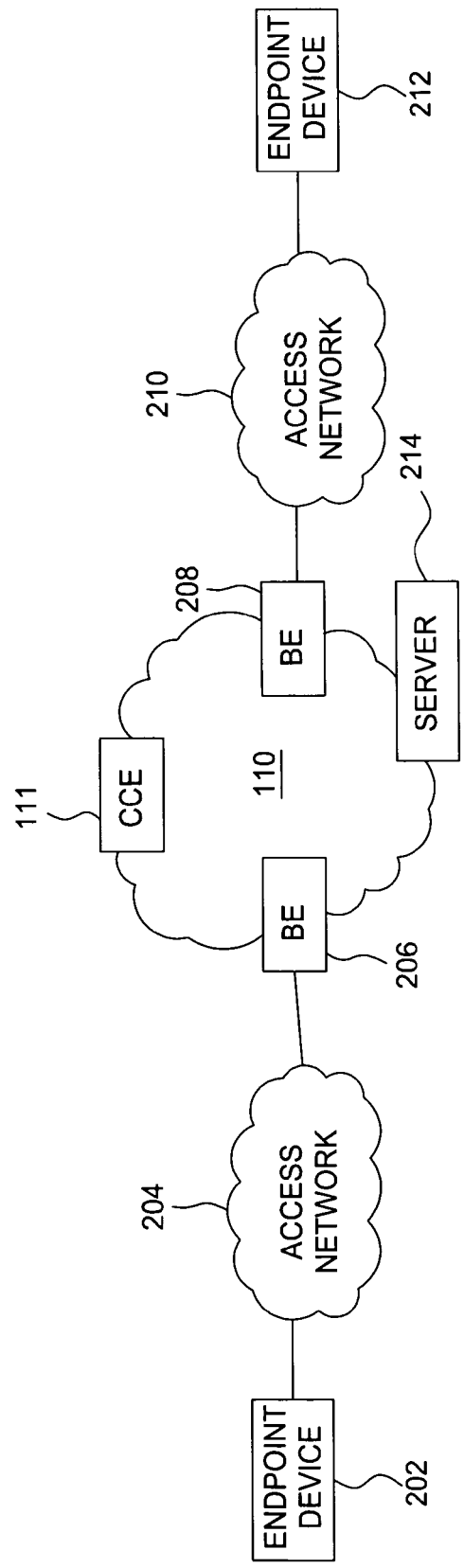
FIG. 2 is a block diagram depicting an exemplary embodiment of a portion of the communication system of FIG. 1 in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc).

The core network 110 further includes a server 214. In one embodiment of the present invention, the server 214 comprises a dedicated application server that is configured to receive cost data pertaining to the core network 110. For example, the application server 214 obtains various forms of cost data associated with network operation tasks such as service requisition, performance monitoring, capacity management, and the like. In one embodiment of the present invention, the application server 214 is configured to determine both a first set of cost factors that are associated with performing the tasks via manual operational procedures and a second set of cost factors that are associated with conducting the tasks by using automated operations. The application server 214 is then responsible for determining whether these tasks should be performed in the network by using either an automated operation mode or manual operation mode based on received cost data.

Notably, each of the aforementioned tasks may be associated with differing costs based on whether a manual operation mode or an automated mode of operation is used by the network. The service requisition task, for example, may involve the receiving of new service subscription orders from customer callers. This may entail receiving the call and recording the customer request (either manually or via automation). In one embodiment, a number of customer care agents as well as various equipment (e.g., telephone, workstation, etc.) must be employed to conduct the service requisition task on a "manual" basis. Consequently, an overall cost for performing this task in this manner may be incurred (e.g., customer care agents' salaries and benefits, equipment costs, office rent, overhead, etc.) and may be subsequently provided to the application server 214 for processing.

Conversely, the task may also be performed on an automated basis. For example, an interactive voice response (IVR) system may be utilized to perform the necessary service requisition functions (i.e., receiving and recording subscription requests). Similarly, certain costs may be incurred to perform the task in this automated matter. Expenses may include equipment purchase costs (e.g., a dedicated IVR server), maintenance costs, software update costs, and the like. These costs are also provided to the application server 214 for processing.

In addition to processing the costs for the service requisition task, the application server 214 may also process the respective manual and automated costs for other network related tasks, such as performance monitoring tasks, capacity management tasks, and the like. A performance monitoring task may involve a number of customer care agents that are responsible for manually monitoring network performance levels (e.g., call blocking, jitter levels, etc.). For example, the manual monitoring may entail care agents viewing and analyzing network performance data on workstation monitors or the like. A capacity management task may involve a number of customer care agents that manually configure network resources in order to maintain acceptable capacity levels in a network. For example, this may entail customer care agents manually entering routing instructions or preferences in order to maintain acceptable capacity levels in network elements. The manual costs for performing the performance monitoring and capacity management tasks is not unlike the costs associated with the service requisition task (e.g., employee salaries, benefits, workstation costs, overhead, etc.). Likewise, the costs for performing these tasks on an automated basis are similar to the service requisition task, although the number and type of network components needed to perform the performance monitoring and capacity management tasks may differ, e.g., specialized application servers may be required.

After receiving the cost data for the various predetermined network tasks (e.g., service requisition task, performance monitoring task, capacity management task, etc.), the application server 214 is capable of calculating a cost index for both the automated and manual operation modes. By initially determining an individual task cost index (e.g., a "cost factor") for each of the network tasks, the application server 214 is subsequently able to derive a collective cost index for each operation mode.

In one embodiment, the application server 214 calculates the cost index of a given operation mode by using individual task cost factors and a cost index formula. For example, the application server 214 may utilize a number of cost factors associated with the corresponding tasks including, but not limited to, service requisition costs (SRC), performance monitoring costs (PMC), capacity management costs (CMC), and other like cost factors that may be related to a particular operation mode. These factors may be used as input parameters for an equation formulated to ascertain a cost index (CI) number of an operation mode. For example, the following formula may be used:

$$\text{Cost Index} = SRC/A + PMC/B + CMC/C \qquad \text{Eqn. 1}$$

where SRC, PMC, and CMC are dollar cost amounts and A, B, and C may each represent the number of customer agents (or network components) respectively needed to perform a task associated with one of the cost factors. More specifically, A, B, and C represent the number of customer care agents when a manual cost index is determined whereas these variables represent the number of network elements when the cost index for an automated operation mode is being formulated. In one embodiment, the cost factor parameters are provided to the application server 214 by a network operator.

As an example of calculating a manual operation mode cost index for a network, suppose the following task cost data is provided to the application server 214: SPC=$2,200,000, PMC=$3,600,000, and CMC=$5,000,000. Similarly, the number of agents needed to perform these tasks entailed A=40, B=60, and C=200. The collective manual cost index for this network would be calculated to be 140,000 (i.e., 55,000+60,000+25,000). Similarly, suppose an automated cost index is calculated. Notably, the automated operation mode was found to be characterized by the following: SPC=$300,000, PMC=$280,000, and CMC=$325,000. In addition, the number of network elements needed to execute the identical tasks required the following number of network elements: A=5, B=7, C=10. The collective cost index for this automated operational mode would be calculated to be 132,500 (i.e., 60,000+40,000+32,500).

After calculating the automated operation cost index and the manual operation cost index, the application server 214 initiates the processing of the two cost indexes. In one embodiment, the application server 214 compares the two cost indexes and determines which of the two operation modes is greater. If the automated cost index is found to be greater than the manual operation mode, then the system continues to use a manual mode of operation.

If the automated cost index is less than the manual operation, then the application server 214 may be configured to issue a recommendation (e.g., to a network operator) to consider the implementation of a more automated, scalable support structure. For example, suppose the cost index for the automated operation is found to be 132,500 and the cost index representing manual operation is 140,000. Since the index for the automated operation is found to be less than the manual operation cost index, a recommendation may be made. In one embodiment, the application server 214 is configured to generate an alarm. The alarm may be a visual and/or audible indicator that serves as the recommendation to a network operator that the implementation of a more automated support structure should be considered.

In another embodiment, the alarm may be generated only if the manual operation cost index exceeds the automated operation cost index by a predefined threshold. This embodiment may be more practical in scenarios where it is not feasible to make a move to an automated support structure if there is not an immediate significant benefit (i.e., it is not worth reconfiguring the network system when cost indexes are nearly identical). It is only after the manual cost index considerably exceeds (e.g., 10% or more) the automated cost index that a move to a more automated network may be warranted. For example, in the scenario above, the application server 214 would determine that the manual operation cost index of 140,000 does not exceed 132,500 by more than 10% (e.g., the manual cost index would need to be greater than 145,750). Therefore, an alarm would not be generated in this instance.

Figure 3:
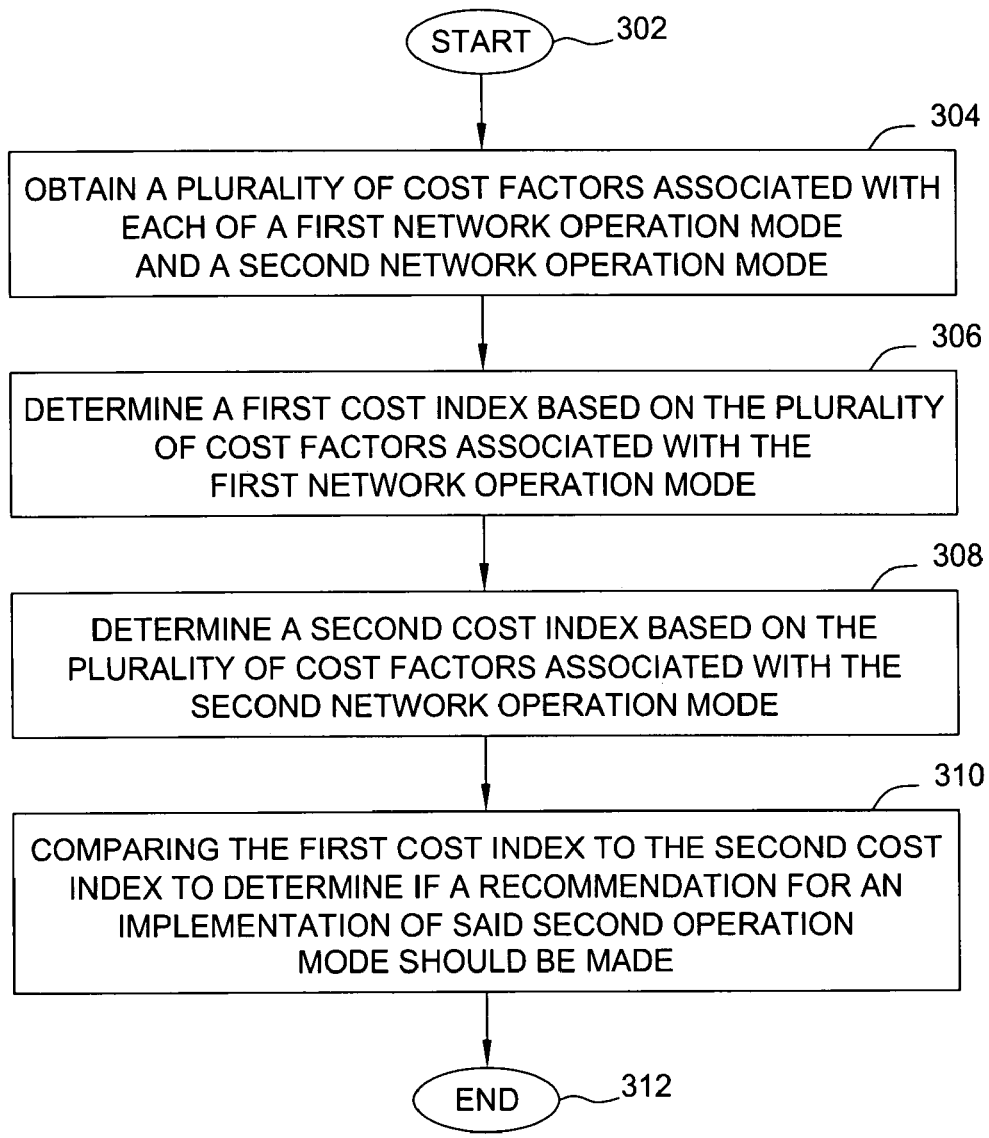
FIG. 3 is a flow diagram depicting an exemplary embodiment of a method for evaluating network operation costs in a communication network in accordance with one or more aspects of the invention.

FIG. 3 is a flow diagram depicting an exemplary embodiment of a method 300 for calculating a cost index in a communication network in accordance with one or more aspects of the invention. The method 300 may be performed by the application server 214. The method 300 begins at step 302 and proceeds to step 304 where a plurality of cost factors associated with each of a first network operation mode and a second network operation mode are obtained. In one embodiment, the first network operation mode and the second operation mode may be a manual operation mode and an automated operation mode, respectively.

At step 306, a first cost index based on the plurality of cost factors associated with the first network operation mode determined. In one embodiment, the plurality of cost factors may comprise cost indexes pertaining to tasks such as service requisition, performance monitoring, capacity management, and the like (e.g., SPC/A, PMC/B, CMC/C) as they relate to a manual operation mode.

At step 308, a second cost index based on the plurality of cost factors associated with the second network operation mode is determined. In one embodiment, the plurality of cost factors may comprise cost indexes pertaining to the same network tasks in step 304 as they relate to a automated operation mode.

At step 310, the first cost index and the second cost index are compared to determine whether a recommendation regarding the implementation of said second operation mode. In one embodiment, the "manual" cost index and the "automation" cost index are compared to each other. In the event that the manual cost index is greater than the automation index, then a recommendation to move to an automated network is made (e.g., via an alarm to a network operator). At step 312, the method 300 ends.

Figure 4:
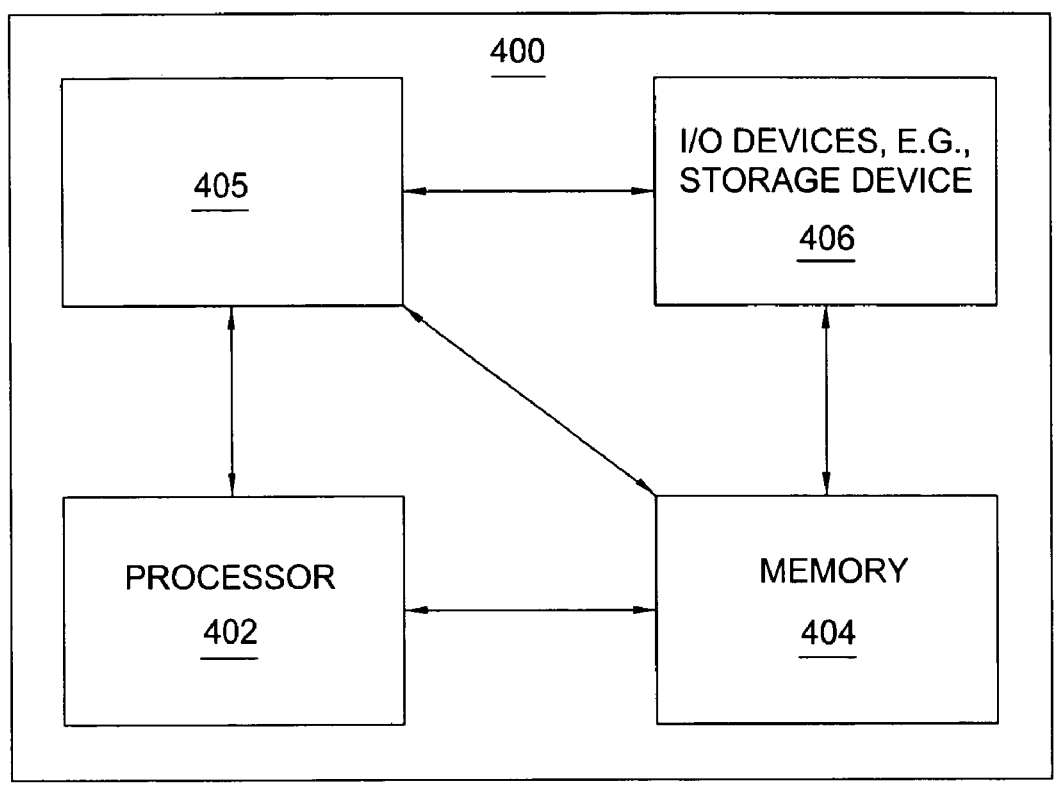
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for evaluating network operation costs, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for evaluating network operation costs can be loaded into memory 404 and executed by processor 402 to implement the functions as discussed above. As such, the present process 405 for evaluating network operation costs (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for calculating a cost index in a communication network, comprising:
    obtaining a plurality of first cost factors associated with a first network operation mode;
    obtaining a plurality of second cost factors associated with a second network operation mode;
    determining a first cost index based on said plurality of first cost factors;
    determining, via a processor, a second cost index based on said plurality of second cost factors, wherein said first and second cost indexes are determined by:

$$\text{Cost Index} = \text{SRC}/A + \text{PMC}/B + \text{CMC}/C$$

where SRC represents a service requisition dollar cost amount, PMC represents a performance monitoring dollar cost amount, and CMC represents a capacity management dollar cost amount and A, B, and C each represents a number of customer agents or a number of network components; and
    comparing said first cost index to said second cost index to determine if a recommendation for an implementation of said second operation mode is to be made.

2. A computer readable medium having stored thereon instructions that, when executed by a processor, causes the processor to perform a method for calculating a cost index in a communication network, comprising:
    obtaining a plurality of first cost factors associated with a first network operation mode;
    obtaining a plurality of second cost factors associated with a second network operation mode;
    determining a first cost index based on said plurality of first cost factors;
    determining a second cost index based on said plurality of second cost factors, wherein said first and second cost indexes are determined by:

$$\text{Cost Index} = \text{SRC}/A + \text{PMC}/B + \text{CMC}/C$$

where SRC represents a service requisition dollar cost amount, PMC represents a performance monitoring dollar cost amount, and CMC represents a capacity management dollar cost amount and A, B, and C each represents a number of customer agents or a number of network components; and
    comparing said first cost index to said second cost index to determine if a recommendation for an implementation of said second operation mode is to be made.

3. An apparatus for calculating a cost index in a communication network, comprising:
    means for obtaining a plurality of first cost factors associated with a first network operation mode;
    means for obtaining a plurality of second cost factors associated with a second network operation mode;
    means for determining a first cost index based on said plurality of first cost factors;
    means for determining a second cost index based on said plurality of second cost factors, wherein said first and second cost indexes are determined by:

$$\text{Cost Index} = \text{SRC}/A + \text{PMC}/B + \text{CMC}/C$$

where SRC represents a service requisition dollar cost amount, PMC represents a performance monitoring dollar cost amount, and CMC represents a capacity management dollar cost and A, B, and C each represents a number of customer agents or a number of network components; and
    means for comparing said first cost index to said second cost index to determine if a recommendation for an implementation of said second operation mode is to be made.

* * * * *